US006944892B1

(12) United States Patent
Giolas

(10) Patent No.: US 6,944,892 B1
(45) Date of Patent: Sep. 20, 2005

(54) OVERFLOW DRAIN FOR TOILET

(76) Inventor: George Giolas, 7938 Davis St., Morton Grove, IL (US) 60053

( * ) Notice: Subject to any disclaimer, the term of this patent is extended or adjusted under 35 U.S.C. 154(b) by 0 days.

(21) Appl. No.: 10/828,696

(22) Filed: Apr. 21, 2004

(51) Int. Cl.[7] .............................................. A47K 3/20
(52) U.S. Cl. ...................................................... 4/427
(58) Field of Search ........................ 4/427, 256.1, 286, 4/289, 290, 292

(56) References Cited

U.S. PATENT DOCUMENTS

| 988,787 | A | * | 4/1911 | Kimble | 4/427 |
| 1,205,078 | A | * | 11/1916 | Barron | 4/427 |
| 1,430,417 | A | * | 9/1922 | Tucker | 4/427 |
| 1,998,145 | A | * | 4/1935 | Pasman | 4/685 |
| 2,778,029 | A | * | 1/1957 | Young | 4/427 |
| 3,262,132 | A | * | 7/1966 | Mann | 4/427 |

* cited by examiner

Primary Examiner—Justine R. Yu
Assistant Examiner—Huyen Le
(74) Attorney, Agent, or Firm—Barnes & Thornburg

(57) ABSTRACT

A commode having overflow protection. An overflow drain arrangement is provided approximate the collection basin for the commode, with the overflow drain arrangement having a collection cavity for collecting a significant amount of overflow. An overflow trap extends from the collection cavity, providing an overflow outlet from the commode separate from the outlet from the collection basin. A plurality of overflow apertures lead from the collection basin to the collection cavity.

10 Claims, 1 Drawing Sheet

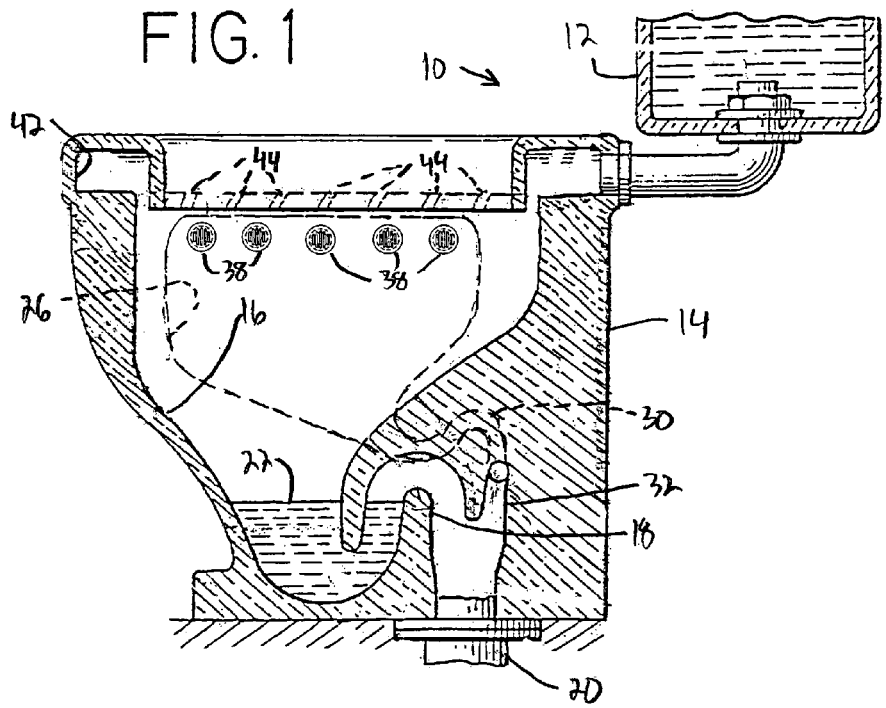
FIG. 1
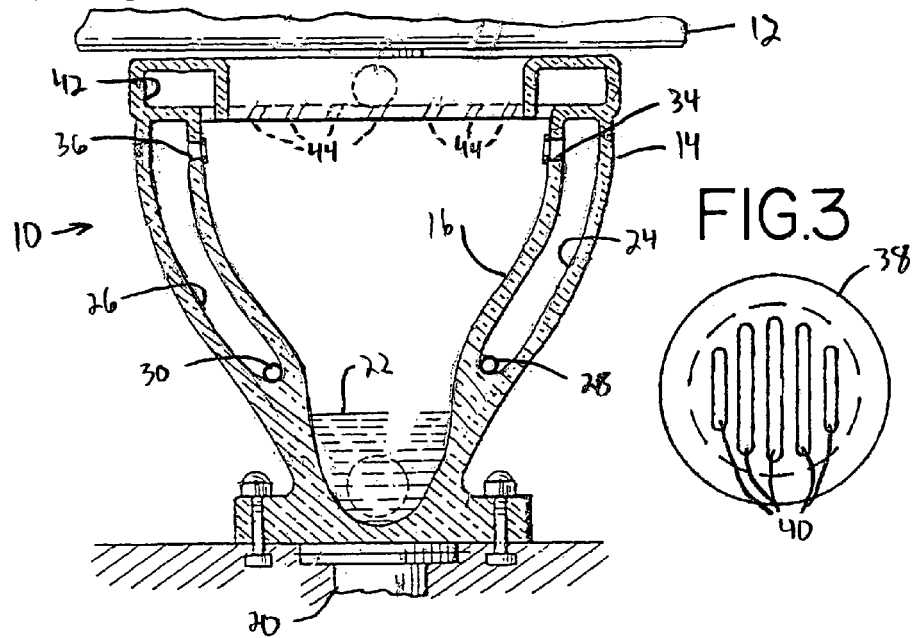
FIG. 2
FIG. 3

OVERFLOW DRAIN FOR TOILET

BACKGROUND OF THE INVENTION

This invention relates to commodes, and in particular to overflow protection for a commode.

Commodes typically have a fairly substantial trap which provides two functions, maintaining a desired water level in the collection basin and providing a clog-free outlet for the egress of waste from the commode into a sewage system. When working properly, overflow is not a concern.

However, for any number of reasons, the trap can become clogged. In that event, flushing of the commode can lead to overflow, and the incumbent mess, sanitation problems, and possibility for spreading disease and infection. Thus, an overflow is sought to be avoided, if at all possible.

Various efforts have been made to provide commodes with overflow protection, with varying degrees of success. For example, U.S. Pat. No. 2,531,475 discloses a commode with overflow protection in the nature of a float arrangement to close the tank valve if an overflow is imminent. U.S. Pat. No. 4,204,285 discloses an overflow protection apparatus comprising a separate reservoir to accommodate a certain amount of overflow. U.S. Pat. No. 6,457,188 is directed to yet another design having a separate storage reservoir which will hold a limited amount of overflow.

Prior such devices have had limited success in containing or holding overflow, but are unable to deal with major overflows. U.S. Pat. No. 3,262,132 is directed to an overflow protection where a separate outlet is provided, and thus, theoretically, can deal with significant and continuing overflows. However, if the overflow is a surge, this patent has no means of containing the overflow as it is being discharged, thus being of limited utility.

SUMMARY OF THE INVENTION

The invention provides a commode having overflow protection. It includes a bowl having a collection basin. A trap is in communication with the collection basin for maintaining a predetermined water level in the collection basin and providing a primary outlet for egress of waste from the collection basin into a drainage system. An overflow drain arrangement is provided approximate the collection basin. The overflow drain arrangement includes at least one collection cavity extending in a vertical orientation along one side of the collection basin substantially coextensive with the one side of the collection basin. An overflow trap extends from the collection cavity providing an overflow outlet into the drainage system separate from the primary outlet. A plurality of overflow apertures lead from the collection basin to the collection cavity.

In accordance with the preferred form of the invention, two of the collection cavities are provided, situated on opposite sides of the collection basin. Each of the collection cavities is provided with a separate overflow trap extending therefrom, thus providing safety backup should one of the collection cavities or its overflow trap ever become clogged.

A protective strainer is provided for each of the apertures leading from the collection basin to the collection cavity. The strainers permit primarily liquid to flow into the overflow drain arrangement.

The overflow apertures leading from the collection basin to the collection cavity are spaced between water outflow paths leading from inlet holes in the bowl rim, so that inlet flushing water is not wasted by inadvertently flowing into the overflow aperture during normal operation of the commode.

BRIEF DESCRIPTION OF THE DRAWINGS

The invention is described in greater detail in the following description of examples embodying the best mode of the invention, taken in conjunction with the drawings figures, in which:

FIG. 1 is a cross-sectional illustration of a commode according to the invention from the side, showing the overflow protection according to the invention;

FIG. 2 is a lateral cross-section of a commode having overflow protection according to the invention, showing collection cavities on either side of the collection basin; and FIG. 3 is an enlarged illustration of one of the strainers used for each of the overflow apertures leading from the collection basin to the collection cavities.

DESCRIPTION OF EXAMPLES EMBODYING THE BEST MODE OF THE INVENTIONS

A commode employing the invention is shown generally at 10. As is typical, the commode 10 includes a water reservoir tank 12 and a bowl 14 having a collection basin 16. As is conventional, a trap 18 leads from the collection basin 16 to a drainage system 20, only a portion of which is illustrated. The trap 18, by virtue of its construction, maintains a predetermined water level at 22, and provides a primary outlet for egress of waste from the collection basin 16. All of this is conventional, and is not described in greater detail.

An overflow drain arrangement is illustrated in combination with the collection basin 16. The overflow drain arrangement includes a collection cavity 24 extending in a vertical orientation along one side of the collection basin 16 and a collection cavity 26 extending along the opposite side of the collection basin 16. The collection cavities 24 and 26 are sized to be able to retain an ample quantity of water that may enter therewithin, as described in greater detail below. The collection cavities 24 and 26 extend substantially coextensive with the side of the collection basin 16 to which they are adjacent.

An overflow trap 28 extends from the collection cavity 24 and an overflow trap 30 extends from the collection cavity 26. The overflow traps 28 and 30 are identical to one another and, similar to the trap 18, are formed so that a predetermined water level can be maintained in each of the collection cavities 24 and 26 to avoid ingress of sewer gases. As shown particularly in relation to the overflow trap 30, the two traps 28 and 30 connect to a channel 32 connected to the trap 18 and extending to the drainage system 20.

A plurality of overflow apertures 34 leads from the collection basin 16 to the collection cavity 24, and similarly, a plurality of overflow apertures 36 leads from the collection basin 16 to the collection cavity 26. While the overflow apertures 34 and 36 can be open connections, preferably a protective strainer 38 is installed in each of the overflow apertures 34 and 36 to prevent all but the smallest of solids from entering the collection cavities 24 and 26. The protective strainer 38 is shown in enlarged fashion in FIG. 3, and has a series of slots 40 to allow water passage while preventing solid passage.

As in conventional, the bowl 14 has a water inlet rim 42 having a series of spaced inlet holes 44. The apertures 34 and 36 are appropriately located in the collection basin 16 so that water outflow paths leading from the inlet holes 44 are between adjacent overflow apertures 34 or 36 so that water enters the basin 16 rather than a portion thereof flowing directly into the overflow apertures 34 and 36 through the protective strainers 38. However, one of each of the apertures 34 and 36 is generally aligned with an inlet hole 44 so that the overflow traps 28 and 30 are filled to their predetermined water levels.

In normal operation of the commode 10, the collection cavities 24 and 26 are inoperative. However, should the trap 18 become clogged for any reason or be unable to maintain an adequate flow so that the water level is maintained at a proper level within the collection basis 16, as water begins to rise in the water collection basin 18, water then flows through the overflow apertures 34 and 36 into the respective collection cavities 24 and 26. To the extent that water does not immediately exit the collection cavities, water can collect within the collection cavities 24 and 26, thus preventing overflow from the bowl 14. Since the overflow traps 28 and 30 are not only separate from one another but also separate from the trap 18, even if the trap 18 becomes clogged, the overflow traps 28 and 30 will accommodate sufficient flow to prevent overflow of the commode 10.

Although it is preferred that there be a pair of collection cavities 24 and 26 as part of the overflow drain arrangement according to the invention, one could be adequate. Also, there could be more than two of the collection cavities, if necessary. Various changes can be made to the invention without departing from the spirit thereof or scope of the following claims.

What is claimed is:

1. A commode having overflow protection, comprising
   a. a bowl having a collection basin,
   b. a trap in communication with said collection basin for maintaining a predetermined water level in said collection basin and providing a primary outlet for egress of waste from said collection basin into a drainage system,
   c. an overflow drain arrangement proximate said collection basin, said overflow drain arrangement including at least one collection cavity extending in a vertical orientation along one side of said collection basin and substantially vertically coextensive with said one side of said collection basin,
   d. an overflow trap extending from said collection cavity providing an overflow outlet into the drainage system separate from said primary outlet, and
   e. a plurality of overflow apertures leading from said collection basin to said collection cavity.

2. The commode according to claim 1, including two of said collection cavities situated on opposite sides of said collection basin.

3. The commode according to claim 2, including a separate overflow trap extending from each collection cavity.

4. The commode according to claim 1, including a protective strainer for each of said apertures.

5. The commode according to claim 1, in which said bowl includes a water inlet rim having a series of spaced inlet holes, said overflow apertures being located between water outflow paths leading from said inlet holes.

6. Overflow protection for a commode having a collection basin and a trap in communication with said collection basin for providing a primary outlet for egress of waste from said collection basin into a drainage system, the overflow protection comprising:
   a. an overflow drain arrangement formed to be located proximate said collection basin, said overflow arrangement including at least one collection cavity shaped to extend in a vertical orientation along one side of said collection basin substantially vertically coextensive with said one side,
   b. an overflow trap extending from said collection cavity providing an overflow outlet into the drainage system separate from said primary outlet, and
   c. a plurality of overflow apertures leading from said collection basin to said collection cavity.

7. The overflow protection according to claim 6, including two of said collection cavities situated on opposite sides of said collection basin.

8. The overflow protection according to claim 7, including a separate overflow trap extending from each collection cavity.

9. The overflow protection according to claim 6, including a protective strainer for each of said apertures.

10. The overflow protection according to claim 6, in which said bowl includes a water inlet rim having a series of spaced inlet holes, said overflow apertures being located between water outflow paths leading from said inlet holes.

\* \* \* \* \*